United States Patent
Parekh

(10) Patent No.: US 10,664,226 B2
(45) Date of Patent: *May 26, 2020

(54) AUDIO FILE PROCESSING TO REDUCE LATENCIES IN PLAY START TIMES FOR CLOUD SERVED AUDIO FILES

(71) Applicant: Google LLC, Mountain View, CA (US)

(72) Inventor: Neel B. Parekh, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/140,116

(22) Filed: Sep. 24, 2018

(65) Prior Publication Data
US 2019/0026069 A1 Jan. 24, 2019

Related U.S. Application Data

(63) Continuation of application No. 15/225,113, filed on Aug. 1, 2016, now Pat. No. 10,082,999, which is a
(Continued)

(51) Int. Cl.
*G06F 3/16* (2006.01)
*G06F 16/632* (2019.01)
(Continued)

(52) U.S. Cl.
CPC .......... *G06F 3/165* (2013.01); *G06F 16/632* (2019.01); *G06F 16/638* (2019.01);
(Continued)

(58) Field of Classification Search
CPC ... H04L 67/2842; H04L 65/80; H04L 65/604; H04L 65/4084; H04L 65/4092;
(Continued)

(56) References Cited

U.S. PATENT DOCUMENTS

2006/0230229 A1 10/2006 Getzinger
2006/0282336 A1 12/2006 Huang
(Continued)

FOREIGN PATENT DOCUMENTS

WO WO 2004/055637 7/2004
WO WO2004/055637 A2 * 7/2004

OTHER PUBLICATIONS

International Preliminary Report on Patentability dated Apr. 1, 2014 in International Patent Application No. PCT/US2012/058104.
(Continued)

*Primary Examiner* — Fan S Tsang
*Assistant Examiner* — David Siegel
(74) *Attorney, Agent, or Firm* — Byrne Poh LLP

(57) ABSTRACT

Methods, systems, and computer programs are presented for managing audio files of a user to reduce latencies in play start times on local devices. The audio files are stored on cloud storage managed by a server. One method includes processing a plurality of audio files associated with a user, where the processing is configured to create audio snippet files from each of the plurality of audio files. The audio snippet files representing a beginning part of each of the plurality of audio files. The method also includes transmitting the audio snippet files to a client device and detecting a request from the client to begin playing a first audio file from the plurality of audio files of the user. The first audio file being stored on the cloud storage managed by the server.

19 Claims, 9 Drawing Sheets

Related U.S. Application Data continuation of application No. 13/597,223, filed on Aug. 28, 2012, now Pat. No. 9,406,341.

(60) Provisional application No. 61/542,188, filed on Oct. 1, 2011.

(51) Int. Cl.

| | | |
|---|---|---|
| *G06F 16/638* | (2019.01) | |
| *G11B 27/034* | (2006.01) | |
| *G11B 27/10* | (2006.01) | |
| *G11B 20/10* | (2006.01) | |
| *H04N 21/433* | (2011.01) | |
| *H04N 21/472* | (2011.01) | |
| *H04N 21/81* | (2011.01) | |
| *H04N 21/845* | (2011.01) | |

(52) U.S. Cl.
CPC .......... *G11B 27/034* (2013.01); *G11B 27/105* (2013.01); *H04N 21/4331* (2013.01); *H04N 21/47202* (2013.01); *H04N 21/8106* (2013.01); *H04N 21/8456* (2013.01); *G11B 2020/10768* (2013.01)

(58) Field of Classification Search
CPC ............. H04N 21/8456; H04N 21/845; H04N 21/4331; H04N 21/2747; H04N 21/433; H04N 65/4092; H04N 21/47202; H04N 21/8106; G11B 27/105; G11B 2020/10768; G11B 27/034; G06F 3/165; G06F 16/638; G06F 16/632
See application file for complete search history.

(56) References Cited

U.S. PATENT DOCUMENTS

| | | | |
|---|---|---|---|
| 2007/0112973 A1 | 5/2007 | Harris et al. | |
| 2008/0139189 A1 | 6/2008 | Hyatt | |
| 2009/0125634 A1 | 5/2009 | Virdi et al. | |
| 2011/0118858 A1* | 5/2011 | Rottler | ............ H04L 63/08 |
| | | | 700/94 |
| 2011/0122939 A1 | 5/2011 | Ganesan et al. | |
| 2011/0296047 A1 | 12/2011 | Orr | |
| 2012/0331167 A1* | 12/2012 | Hunt | ............ G06F 21/10 |
| | | | 709/231 |

OTHER PUBLICATIONS

International Search Report and Written Opinion dated Apr. 9, 2013 in International Patent Application No. PCT/US2012/058104.
Notice of Allowance dated May 23, 2018 in U.S. Appl. No. 15/225,113.
Notice of Allowance dated Nov. 20, 2015 in U.S. Appl. No. 13/597,223.
Office Action dated Apr. 7, 2015 in U.S. Appl. No. 13/597,223.
Office Action dated Nov. 2, 2017 in U.S. Appl. No. 15/225,113.
Office Action dated Dec. 14, 2017 in U.S. Appl. No. 15/225,113.

* cited by examiner

AUDIO FILE PROCESSING TO REDUCE LATENCIES IN PLAY START TIMES FOR CLOUD SERVED AUDIO FILES

CROSS-REFERENCE TO RELATED APPLICATIONS

This application is a continuation of U.S. patent application Ser. No. 15/225,113, filed on Aug. 1, 2016, which is a continuation of U.S. patent application Ser. No. 13/597,223, filed on Aug. 28, 2012, which claims priority to U.S. Provisional Application No. 61/542,188, filed on Oct. 1, 2011, which are hereby incorporated by reference herein in their entireties.

DESCRIPTION OF THE RELATED ART

Internet applications have grown tremendously over the years and so has the functionality provided to devices that access those applications. One area that has seen such growth relates to audio file management. As users continue to purchase and store more audio music files on their devices, management of those files becomes ever more important. Commonly, users have music libraries on various devices and those devices are usually backed up from time to time. If a user has more than one device, more synchronization is necessary to ensure that each device has access to the desired music. As users upgrade their devices or lose their devices, added complexities arise in syncing new devices to older music libraries. Many times, the management becomes so extensive that users lose some or most of their libraries.

To address these issues, services are now being provided to allow online cloud storage of their music files. However, improvement is still needed to address various challenges posed by cloud storage. It is in this context that embodiments arise.

SUMMARY

Embodiments of the present invention provide methods, systems, and computer programs for managing audio files stored in cloud based systems and allowing devices to access music for play on local devices without delay, while accessing the cloud based system. It should be appreciated that the present invention can be implemented in numerous ways, such as a process, an apparatus, a system, a device or a method on a computer readable medium. Several inventive embodiments of the present invention are described below.

In one embodiment, methods, systems, and computer programs are presented for managing audio files of a user to reduce latencies in play start times on local devices. The audio files are stored on cloud storage managed by a server. One method includes processing a plurality of audio files associated with a user, where the processing is configured to create audio snippet files from each of the plurality of audio files. The audio snippet files represent a beginning part of each of the plurality of audio files. The method also includes transmitting the audio snippet files to a client device and detecting a request from the client to begin playing a first audio file from the plurality of audio files of the user. The first audio file is stored on the cloud storage managed by the server. The method further includes transmitting at least a remaining part of the first audio file to the client in response to the request. The remaining part having an identified transition start point, and the transition start point is a time in the first audio file that corresponds to an end time of a first audio snippet file that corresponds to the first audio file. Play of the first audio file at the client begins with the first audio snippet file, while the transmitting of at least the remaining part of the first audio file occurs in a background download operation and play transitions to the remaining part of the first audio file after reaching the end time of the first audio snippet file.

In another embodiment, a method for playing audio files on a device that obtains audio files from a cloud storage system is disclosed. The method includes executing an application on the device that communicates over the Internet with music provider logic of a server. The music provider logic of a server accesses the cloud storage system on which audio files of a user are stored. The method includes synchronizing the application with the music provider logic to obtain audio snippet files for one or more of the audio files of the user. Then, storing the audio snippet files in persistent storage of the device. The method includes detecting selection for play of a first audio file on the device. The first audio file is one of the audio files of the user. The detected selection causes a background download of at least a remaining part of the first audio file from the cloud storage system. Then, accessing a first audio snippet file from the persistent storage of the device. The first audio snippet file corresponds to the selected first audio file. The method includes beginning play of the first audio file using the first audio snippet file stored in the persistent storage of the device, and transitioning play of the first audio file from the first audio snippet file to the remaining part of the first audio file that was background downloaded from the cloud storage system while play of the first audio file snippet file was in progress. The method is executed by a processor.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

DETAILED DESCRIPTION

The following embodiments describe methods, computer programs, and systems for managing audio files and serving audio files to users that store audio files on cloud based networks. Cloud based networks include servers that manage requests from applications to serve data, and the cloud based networks are connected to cloud storage for managing the data and serving the data to requesting applications when users of the applications request use of certain files. The audio files are provided the requested applications in a streaming format and the devices do not generally store the copies of the obtained audio files.

In accordance with one embodiment, client devices are provided with partial content of the audio files, which are stored on the client devices, to reduce initial playback latency. As described below, the methods and system enable audio libraries to be processed to produce snippets of each of the audio files in the libraries. The snippets are then forwarded to the user for storage in the local devices. The snippets are just a fraction of the entire audio file, and initial play of a selected song or songs will begin immediately from the locally stored snippet. During the play from the stored snippet, background downloading occurs to then allow smooth transition from the snippet to the remaining part of the song. From the standpoint of the user, playing songs on a local device will appear nearly instantaneously, without the normal delay of waiting from streaming content to be ready to play from the stored full audio files obtained from the cloud storage. It will be apparent that the present embodiments may be practiced without some or all of these specific details. In other instances, well known process operations have not been described in detail in order not to unnecessarily obscure the present embodiments.

Figure 1:
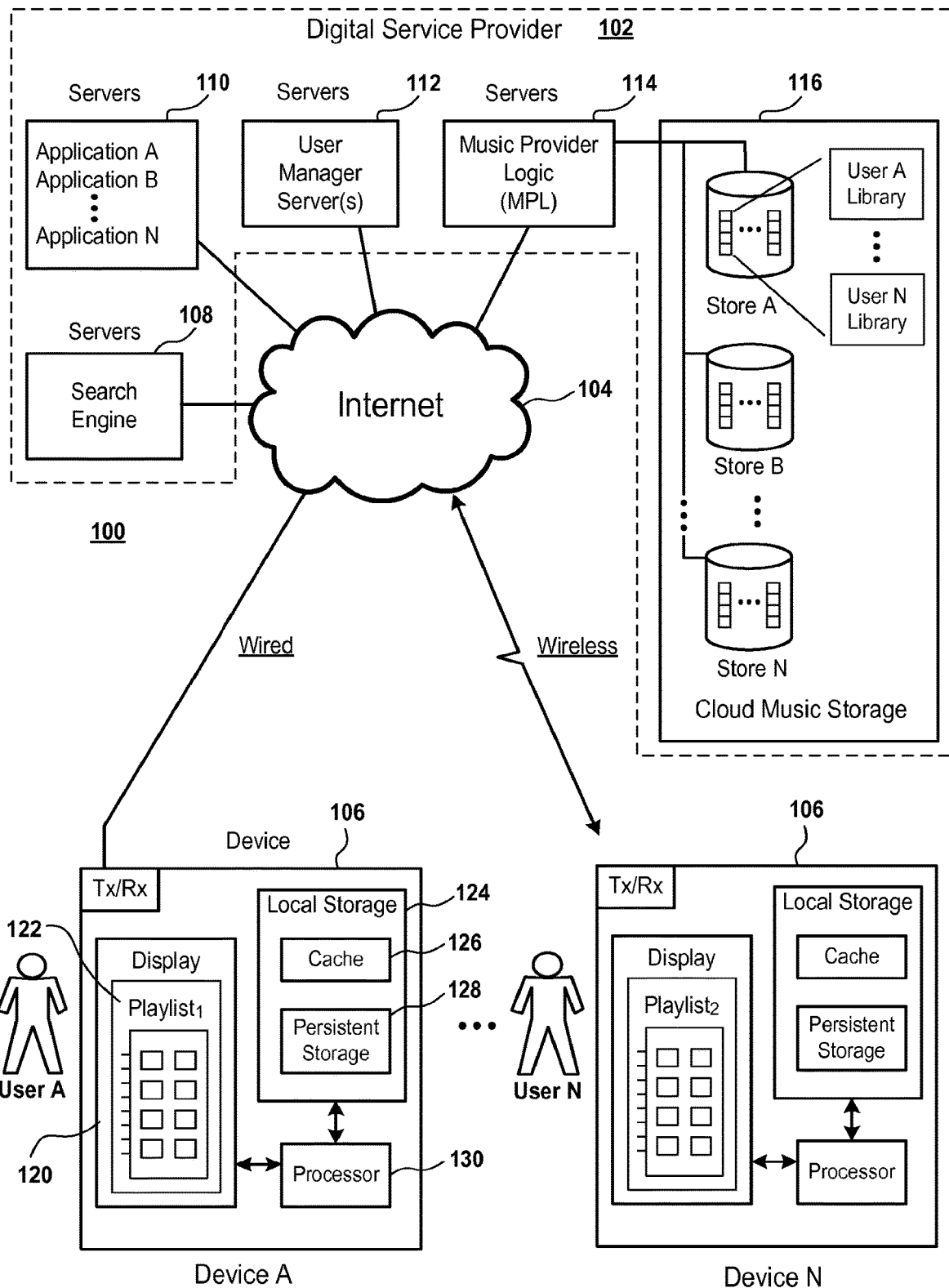
FIG. 1 illustrates a system diagram for enabling access and playing of music files stored in cloud storage, in accordance with one embodiment of the present invention.

FIG. 1 illustrates a system diagram 100 that defines methods for accessing and playing music files stored in cloud storage, and improving the rate at which playing of a music file response to user selection, is disclosed in accordance with one embodiment of the present invention. The system includes a plurality of servers that are connected to the Internet 104. The plurality of servers and storage are, in one embodiment, part of a digital service provider 102. The digital service provider 102, is a system that can include a plurality of servers that can provide applications, services, digital content, and interconnectivity between systems, applications, users, and social networks. For example, the digital service provider 102 can include a search engine 108, a plurality of servers 110 that provide applications for various business, social, and technology related subject matter, servers that provide user management 112, and servers to provide music related services.

One example digital service provider 102 can be Google Inc. of Mountain View, Calif. Other digital service providers can be more focused to provide only specific services, while others provide a variety of services for access, download, viewing, searching, etc. The content can vary greatly, but is commonly presented in digital format and displayed on monitors or screens of devices, computers, smart phones, tablets, etc.

The servers that provide music related services, in one embodiment, are illustrated by the music provider logic (MPL) 114, that executes over one or more servers that are connected to the Internet 104. The music provider logic 114 is shown connected to cloud music storage 116. Cloud music storage 116 is shown to include a plurality of storage systems, identified as store A, store B, and store N. The various storage systems that hold music data and music metadata, are provided with fast access to the Internet, for providing music data on demand to users requiring access to their music library stored in cloud music storage 116. In one embodiment, users can access the cloud music storage 116 by way of a plurality of devices 106. The plurality of devices can include any type of device having a processor and memory, wired or wireless, portable or not portable. In the example illustrated in FIG. 1, user A is shown to have device 106 (device A). Device 106 is shown to include communication logic for transmitting and receiving data between device 106 and the Internet 104.

The communication logic (Tx/Rx) can include various types of network interface circuitry, radio-communication (e.g. wireless), cell tower communication, or interconnected wiring connected to Internet service providers. Device 106 is also shown to include a display having a screen 120, local storage 124, and a processor 130. Local storage 124 can include cash memory 126, persistent storage 128, and other logic. In this example, device 106 is shown to include graphical icons (e.g., graphical user interfaces GUIs) that represent a playlist. The screen 120 can be a touch-screen, or a display typically provided by a flat-panel display, a cathode ray tube (CRT), or other media capable of rendering a display. Still further, device 106 can have its display separate from the device, similar to a desktop computer or a laptop computer. Still further yet, device 106 can be in the form of a smart phone, a tablet computer, or hybrids that provide touch green capability in a portable form factor. One example device can include a portable phone device that runs an operating system and is provided with access to various applications (apps) that may be obtained over the Internet, and executed on the local portable device (e.g., smart phone, tablet, laptop, desktop, etc.).

In one embodiment, the user of device 106 can install an application that provides cloud storage of music files, and access to the storage cloud music files from the device 106. Once the user's music files are uploaded to the cloud music storage 116, the user's music files are associated to a library of the user. In one embodiment, a plurality of users can access the same application and can upload their own music files to create their own library, which will be stored in the cloud music storage 116.

Each of such users can then access the cloud music storage 116 through an application on their device 106 to render and play selected music files on their device, when the device 106 has access to the Internet and associated servers of the music providing logic 114 and cloud music storage 116. Accordingly, users can access the music application on their device 106, access all music files stored in cloud music storage 116, arrange music titles in their music library into playlists, add music to the cloud music storage 116, delete music from the cloud music storage 116, and purchase music that is added to the cloud music storage 116. These changes are maintained and managed by the music provider logic 114 and music provider logic 114 will provide access to the various users to their music files stored in the cloud music storage 116, based on their selections during use of the application.

Figure 2:
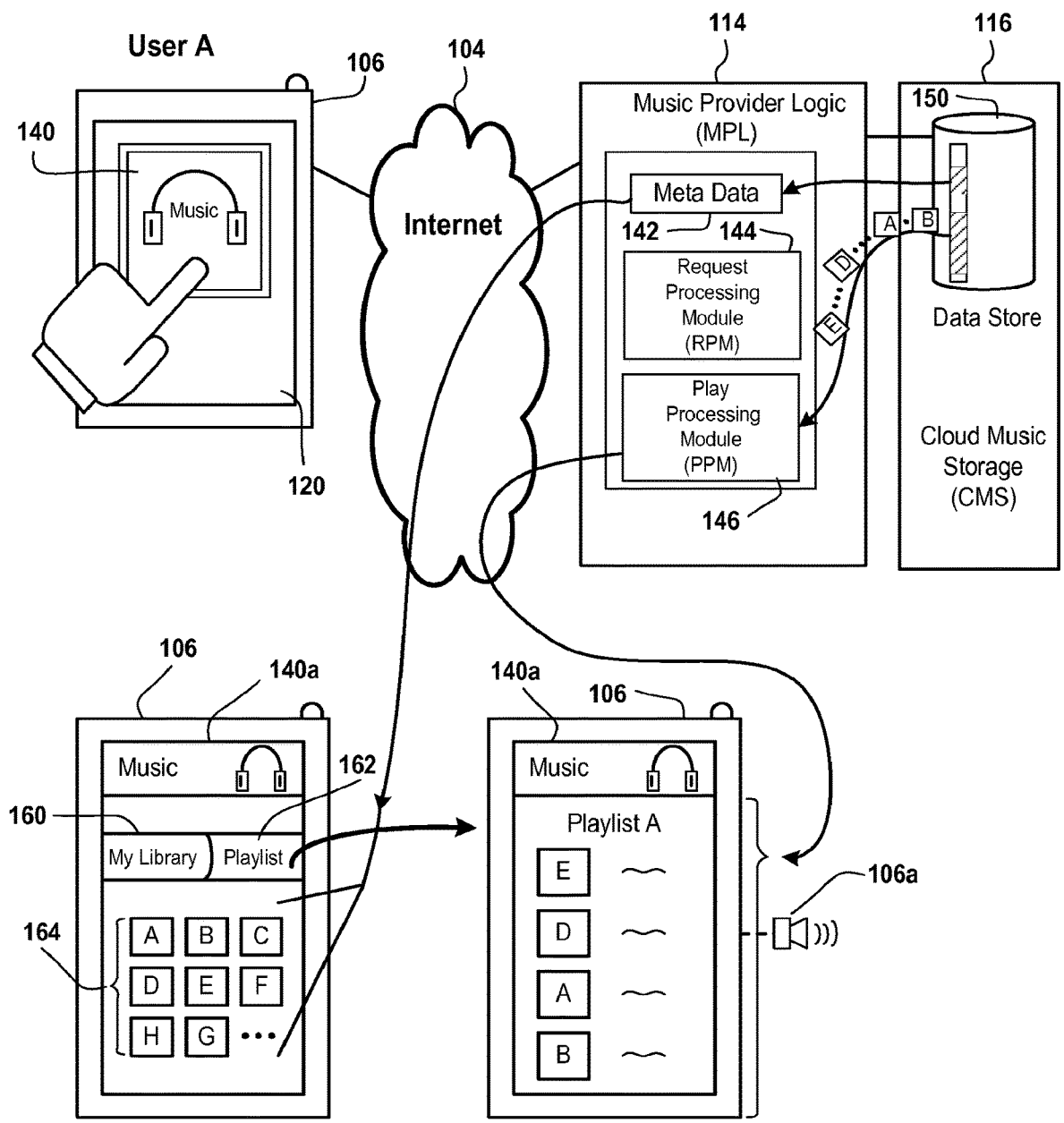
FIG. 2 illustrates how user A utilizes a device 106 (e.g. smart phone) to access his or her music library stored in the cloud music storage (CMS) 116, in accordance with one embodiment of the present invention.

FIG. 2 illustrates how user A utilizes a device 106 (e.g. smartphone) to access his or her music library stored in the cloud music storage (CMS) 116, in accordance with one embodiment of the present invention. As shown, the device 106 will include a screen 120, and associated graphical icons that present a thumbnail of an application 140, associated with a music application. Application 140, as described herein, relates to an application that provides a user with access to his or her music library which has been previously added to the club music storage 116. If the user is a new user to the application 140, the new user can download application 142 device 106 from at least one server 110 of the digital service provider 102.

Once the application has been downloaded and installed on device 106, the icon representing application 140 will be rendered on the display screen of device 106. Initially, the user will be prompted to select music to add to the cloud music storage 116. The music may be added from files currently maintained by the user on his or her device 106, on other devices of the user such as computers, other smart phone and or tablets, or other storage media. Additionally, the user can add music files that may be part of a music library maintained by another application. The other application may maintain a specific format for the music, and the music can be obtained and translated to standardize music files for addition to the cloud music storage 116.

Once the user has managed his library to add, modify, or adjust the music files present in the cloud music storage 116, the user can access application 140 and various options from graphical user interfaces provided on the screen 120 of device 106. In the illustrated example, device 106 will open application 140 through various graphical user interface screens, such as interface 140a. Interface 140a can include various menus, selection icons, configuration icons, displays, advertisements, buttons, listings, etc. In this example, the interface 140a may include an icon that lists the user's library 160, the user's playlist 162, and music title icons 164. Music title icons can be represented by graphical artwork that represents artwork associated with the various music files present in the user's library. The user's library is illustrated by title icons 164, shown as A-H.

The title icons 164 are rendered on the screen 120 upon obtaining metadata from the cloud music storage 116, which may be present in data store 150. Music provider logic 114 will include request processing module 144 that manages the requests and communication between various user applications 140 and the cloud music storage 116. The request processing module (RPM) 144 is also in communication with a play processing module (PPM) 146. In order to render the title icons 164 on the screen of the device 106, the music processing logic 114 will utilize the request processing module 144 to obtain metadata 142 from the data store 150.

The metadata 142 will be the metadata associated with the various music files stored in data store 154 the requesting user. The metadata 142 provides information regarding each of the titles stored in the cloud music storage 116, and sufficient information to render the title icons 164 on the screen of device 106, and provide text information, duration information, genre information, and other data that describes aspects or characteristics of the music files. As shown, when the user selects playlist 162 on device 106, a playlist graphical user interface is shown identifying particular songs that have been arranged by the user.

The playlist A represents various songs that were selected by the user to be part of playlist A. The user can have various playlists, and the selection of playlist A is only provided as one example of a playlist that includes music files that are played in the order E→D→A→B. Once the user selects a corresponding play button or clicks on one of the audio files in the playlist, the music files will begin to play in the order arranged and defined by the user in his or her playlist A.

Figure 3A:
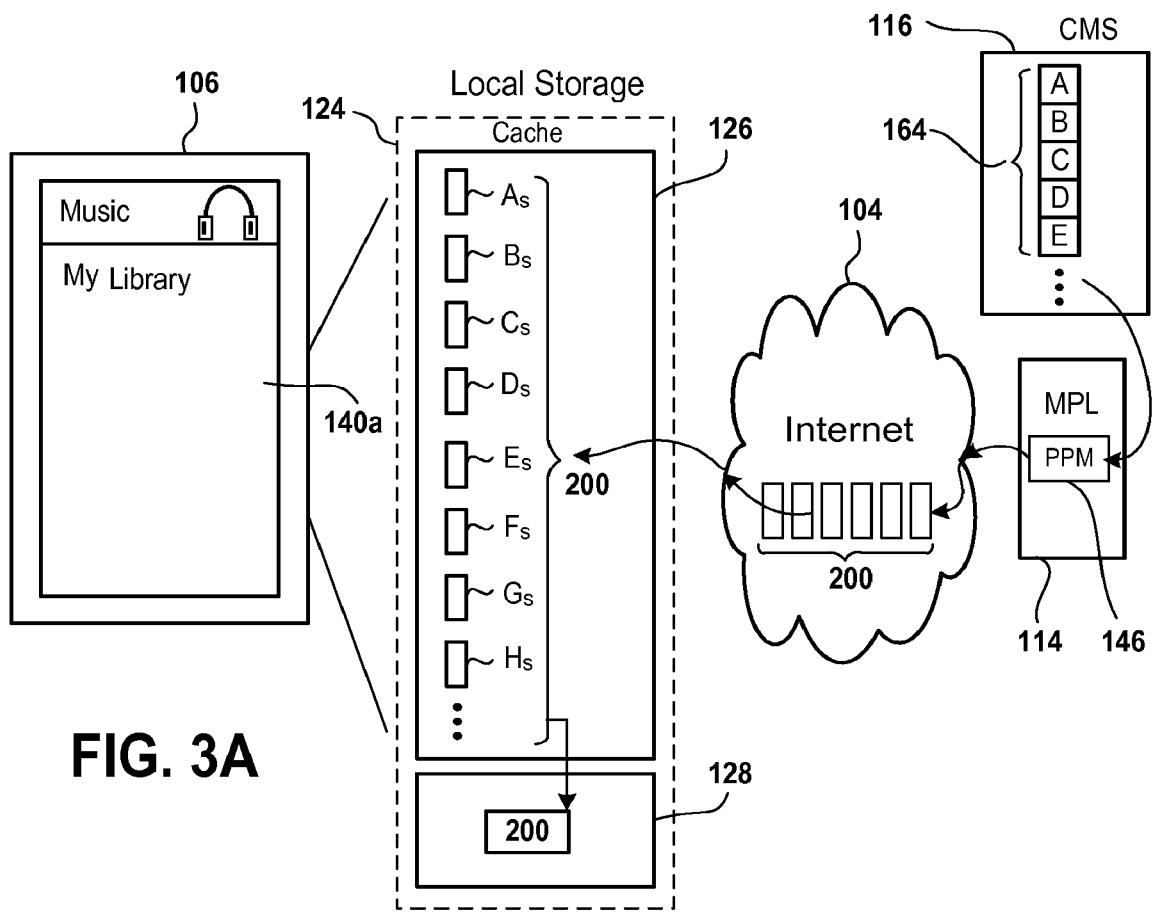
FIGS. 3A and 3B illustrate embodiments for obtaining snippets of a user's music library and locally scoring the obtained snippets.

In one embodiment, FIG. 3A illustrates a method for pre-fetching snippets 200 of each of the user's audio files and storing the snippets in persistent storage 128 of device 106. In one embodiment, when the user first accesses the application 142 to manage the music files stored in cloud music storage 116, or accesses the application 140 at a later time after storing the music files in the cloud music storage 116, the music provider logic 114 will automatically process the user's audio files to create clips of each of the audio files. The clips, as described herein are referred to as a "snippet."

This term is used, as it connotes that a portion of less than the entire file is snipped off the full file. The snippet can be of any size that is less than a full original file, e.g., such as an audio file of a song, that is commonly referred to as a track. In one embodiment, the snippet is less than 50% of the original file, and in other embodiments, a percentage that is less than 25% of an original file. In still other embodiments, the percentage can range between 2% and 25% of an original file size. In one embodiment, the file size can be characterized by length in time or length in bytes/bits. In one example, however, the size of the snippet will depend on the size of the audio file, as they all differ based on their content. The size of the snippet can also be sized to allow time to start the background streaming of the remainder of the audio file. This time will vary, depending on various factors, such as equipment utilized, internet connection speeds, server delays, authentication delays, etc.

For example, if an audio file is 3 min. long, this snippet may be the first 20 or 30 seconds. The exact size of this snippet can vary, and is adjustable depending on the size of the user's persistent storage, and the speed at which audio files can be downloaded during play from the cloud music storage 116. In one embodiment, the processing by the music provider logic 114 of the user's audio files can be performed at any time while the audio files are stored in the cloud music storage 116. As such, the snippets can be pre-processed and stored in the cloud music storage 116 along with the full audio files of the user. The snippets can also be processed to produce lower bit rate snippets of the higher bit rate music files.

As is known, several bit rates are specified in the MPEG-1 Audio Layer III standard: 32, 40, 48, 56, 64, 80, 96, 112, 128, 160, 192, 224, 256 and 320 kbit/s, and the available sampling frequencies are 32, 44.1 and 48 kHz. Additional extensions were defined in MPEG-2 Audio Layer III: bit rates 8, 16, 24, 32, 40, 48, 56, 64, 80, 96, 112, 128, 144, 160 kbit/s and sampling frequencies 16, 22.05 and 24 kHz. A sample rate of 44.1 kHz is almost always used, because this is also used for CD audio, which is one source used for creating MP3 files. A greater variety of bit rates are used on the Internet. The rate of 128 kbit/s is commonly used, at a compression ratio of 11:1, offering adequate audio quality in a relatively small space. As Internet bandwidth availability and hard drive sizes have increased, higher bit rates up to 320 kbit/s are widespread. Uncompressed audio as stored on an audio-CD has a bit rate of 1,411.2 kbit/s, so the bit rates 128, 160 and 192 kbit/s represent compression ratios of approximately 11:1, 9:1 and 7:1 respectively. Standards that define MP3's, such as ISO/IEC 11172-3, ISO/EEC 13818-3, and other non-proprietary standards for audio associated with MPEG-1 Audio Layer III, MPEG-2 Audio Layer III, and MPEG 2-5, Audio Layer III, are all herein incorporated by reference. Thus, for more information regarding the construct of an audio file, reference may be made to these standards. In still other embodiments, other types of audio formats are envisioned, including proprietary formats. So long as an audio file can be of a certain length and can be played or listened to, the audio file can be utilized, transmitted, trimmed, copied, compressed, processed and/or reformatted for use in accordance with the defined embodiments of the present invention.

Generating lower bit rate snippets will reduce the size of the snippets, and will improve the speed at which the snippets 200 can be downloaded to cash 126 and then to persistent storage 128 of the user's device 106. The downloading of the snippets 200 can also be performed as a background operation during access by the user to the audio files in the cloud music storage 116, or when the application 140 has access to the Internet and is capable of processing data to obtain the snippets 200 from the music provider logic 114 and cloud music storage 116. As noted above, the snippets can be provided in the form of lower bit rate snippet files to preserve space on the user's device. If the user has a very large music library, then lower bit rate snippet files will preserve space on the user's device.

If the user has few music files in his or her music library, then the snippets can be provided in the form of higher bit rates snippets. The rate at which the snippets are transferred to the user's device 106 is not limiting, as this process can be performed as a background operation during set up, general access to the music application 140, or during nonuse of the music application 140 in a background operation.

To provide a more specific example, if a user has 3000 songs in their music library collection, and the first 30 seconds of each of the songs is downloaded at a bit rate of 64 kbps (radio quality sound), this would only be about 700 MB of data. In contrast, if every song in the 3000 song library were downloaded at the actual bit rate of the music songs, the space occupied would be in the neighborhood of 15 GB of data. In one embodiment, some of the snippets can be provided at a higher bit rate, while other snippets can be provided in lower bit rate formats. In this manner, certain files that require higher fidelity can be preprocessed into snippets that are high bit rate snippets, while other files that do not require the high fidelity can be provided as low bit rate snippets. In other embodiments, all the snippets can be provided in high bit rate formats. As can be appreciated, any number of combinations of high bit rate and low bit rate snippets can be generated by the music provider logic 114, and transferred in downloads to the device 106.

Once all of the snippet files 200 have been pre-fetched for the specific music library of the user, the user can then access a specific song or songs from his library stored in the cloud music storage 116 for play. In one embodiment, upon detecting that the user has selected a song for play, the device 106 can begin playing the song immediately by starting to play the snippet of the full audio file (e.g. begin playing the first 30 seconds). At the same time the user is listening to the first 30 seconds of the snippet (that is locally stored and kept in persistent storage for immediate play), the music provider logic 114 can provide the remainder of audio data for the selected song.

The remainder of the audio data for the selected song would be provided by the music provider logic 114 upon receiving a request from the application 140 which detects that the user has begun to play a song, and the application 140 will begin playing that selected song from this snippet file associated with that song. As a result, the user will perceive that play of the selected song from the cloud music storage 116 occurs instantly upon selecting the song, without waiting for the download of the song from the cloud music storage 116.

Although the user's music library files are stored in the cloud music storage 116, the snippets 200 are stored locally on the device to enable immediate play of selected songs by beginning play of the corresponding selected snippets, and then transitioning play of the remaining part of the song that is downloaded from the cloud music storage 116 in the background while the user is listening to the first part of the song from the local stored snippet of the song. In one embodiment, by the time the user gets to the end of the snippet (e.g. the end of the 30 second mark), the user can transition to listening to the remainder of the song in a streaming fashion from the file that is being provided from the cloud music storage 116. From a listening standpoint, the transition between the snippet and the remainder of the song is a seamless playback experience with essentially zero initial lag. Although a transition occurs between the snippet and the remainder of the audio file, timing comparison between the snippet and the time elapsed in the song, it is possible to identify a corresponding time in the full audio file.

The corresponding time can be within fractions of a second, which is essentially unnoticeable to a human ear during playback. As noted, the size of the snippet can vary in size and associated time duration. The size can also be based on data bytes, rather than the number of seconds. In other embodiments, pre-fetching of the snippets of a user's library can be limited to a set number of audio files. This may be required if the user has uploaded a very large music library to the cloud music storage 116. As such, various combinations of snippet size, and variations in the number of songs that are preprocessed to create snippets and the number of snippets 200 downloaded to the user's local storage in the device 106 can be provided.

Continuing with the embodiment of FIG. 3A, it is illustrated that a graphical icon 140a of application 140 stored on device 106 can execute access to the cloud music storage 116 and can be provided with the snippets 200 of the user's audio files A-E 164. As noted above, the music provider logic can process the user's audio files and the play processing module 146 can provide the various snippets 200 to the cache of the local storage 124 in device 106. The snippets 200 are then stored to persistent storage 128, for later access by the user and to provide immediate play of songs selected by the user.

Figure 3B:
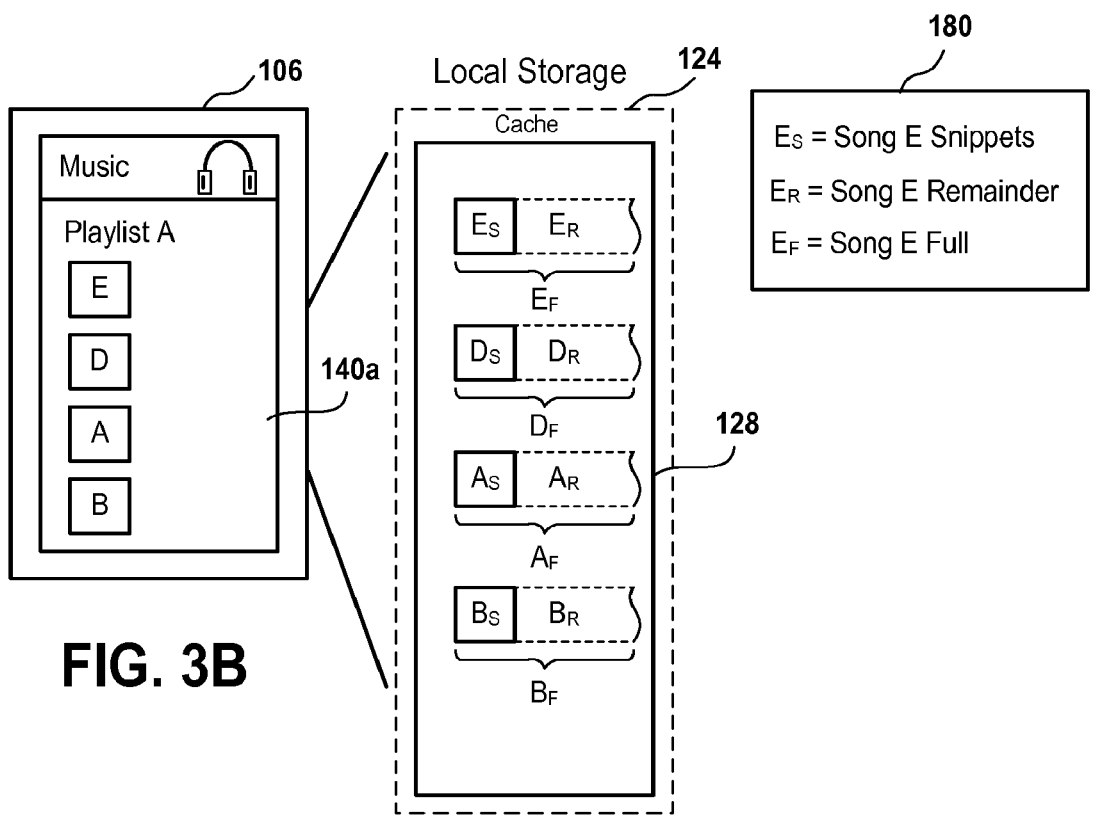

FIG. 3B illustrates an example where a user has selected a playlist A, which has songs E, D, A, B. In this example, persistent storage 128 shows that snippets Es, Ds, As, and Bs have been downloaded and stored on the user's device 106. For ease of discussion, definitions 180 show various examples of parts of an audio file E. An audio file E will include a song snippet Es, a song remainder Er, and a full song Ef. If the full songs were present in local storage 124, the space occupied by the entire library would be excessive, and would defeat the convenience of having cloud storage for the audio files contained in the user's library. For this reason, only snippets are stored in the local storage 124, in accordance with one embodiment of the present invention.

Figure 4A:
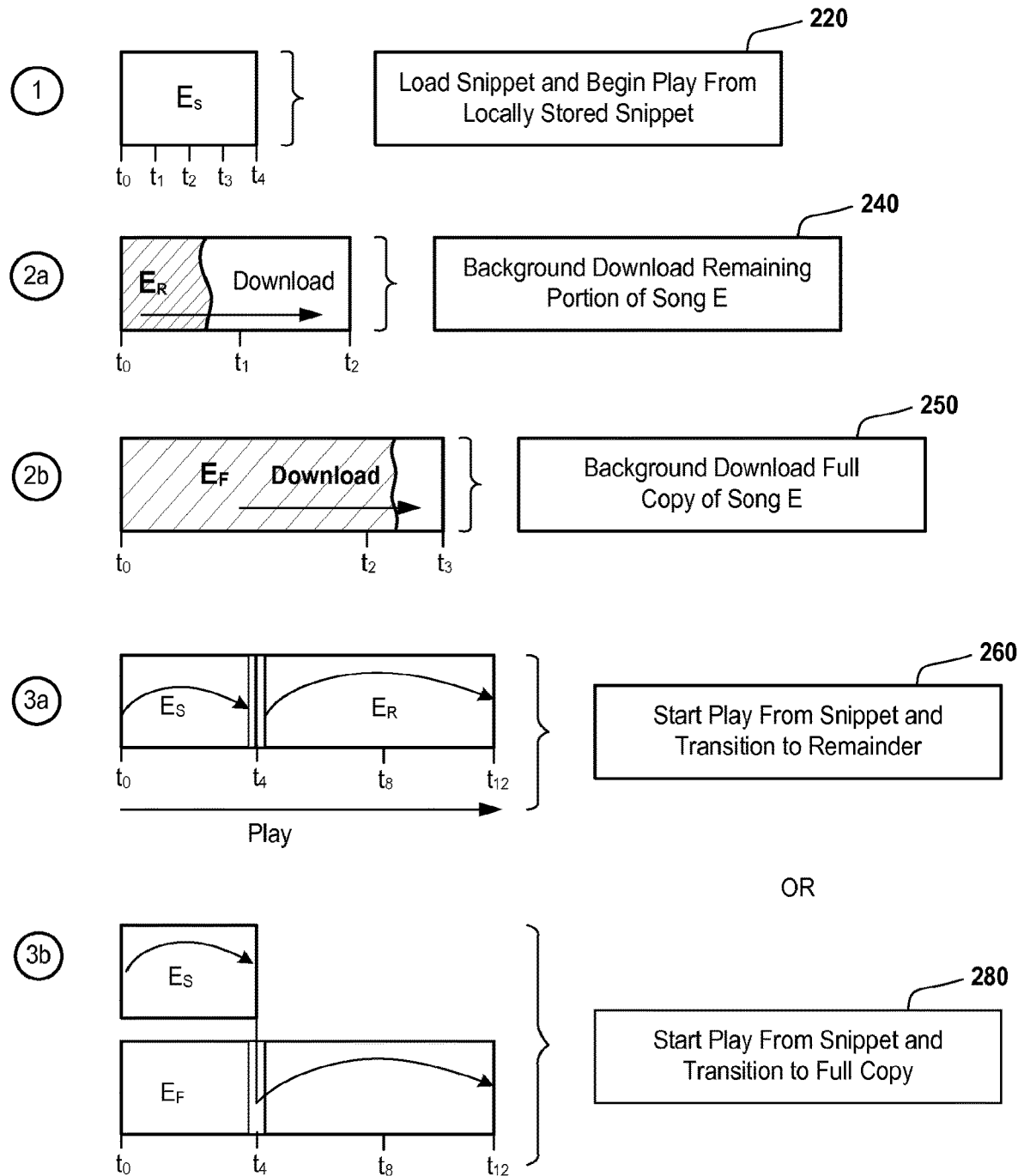
FIGS. 4A and 4B illustrate methods for playing music files, beginning from a snippet and transitioning to a remaining portion of the audio file, in accordance with one embodiment of the present invention.

FIG. 4A illustrates various examples for timing of play of a snippet Es of song E in the user's playlist A, in accordance with one embodiment of the present invention.

In item (1), the snippets Es can have a duration from t0-t4. As noted in operation 220, when the user selects to play song E, the snippet is loaded for immediate play from the locally stored snippets 200 of the user's device 106. This provides for immediate play and response to a user's desire to listen to a specific song.

In item (2a), it is shown that the remainder of song Er has been downloaded in the background while the user is listening to snippet Es. In this example, operation 240 shows that background downloading occurs for the remaining portion of song E, and in this example, the remaining portion of song Er, will complete downloading at t2, which is well before the playtime of snippet Es, which lasts up to t4. In this example, only the remaining portion of the audio file E is downloaded during the background operation 240.

In the example in item (2b), the entire original audio file for song E is downloaded, and represented as a full audio file Ef. During this background downloading operation 250, the full song Ef will take up to time t3 to download, which is slightly longer than the time needed to download the remaining portion of song E that does not include the snippet Es. Nevertheless, in this example, the background downloading of the full song Ef completed before the listening playtime of the snippet Es, which in this example lasted until time t4.

In item (3a), operation 260 illustrates that a user will start playing from the snippet Es and then transition into the remaining portion of the song Er. As noted above, the transitioning between the snippet and the remaining portion of the song can be calculated to eliminate glitches during playback. Glitches can be eliminated by identifying the end time of specific frames in the audio contained in the snippet Es, and then identifying the same frame timing in the original audio file, which produces a beginning time for the remaining portion of the audio file Er. As such, this processing would be performed by the play processing module 146 and other associated logic in the music provider logic 114, to enable appropriate sizing of the remaining audio file Er, which is then streamed to the device 1064 playback upon completion of the user listening to the snippet Es.

In item (3b), operation 280 performs the start of play from the snippet Es, and then transitions to the appropriate time in a full audio file Ef, which was downloaded to the device 106. Identifying the location at which to begin play in the full audio file Ef can be calculated and provided to the device 106 by the music provider logic 114, or can be calculated by logic executed and managed by the application 140 on device 106.

Figure 4B:
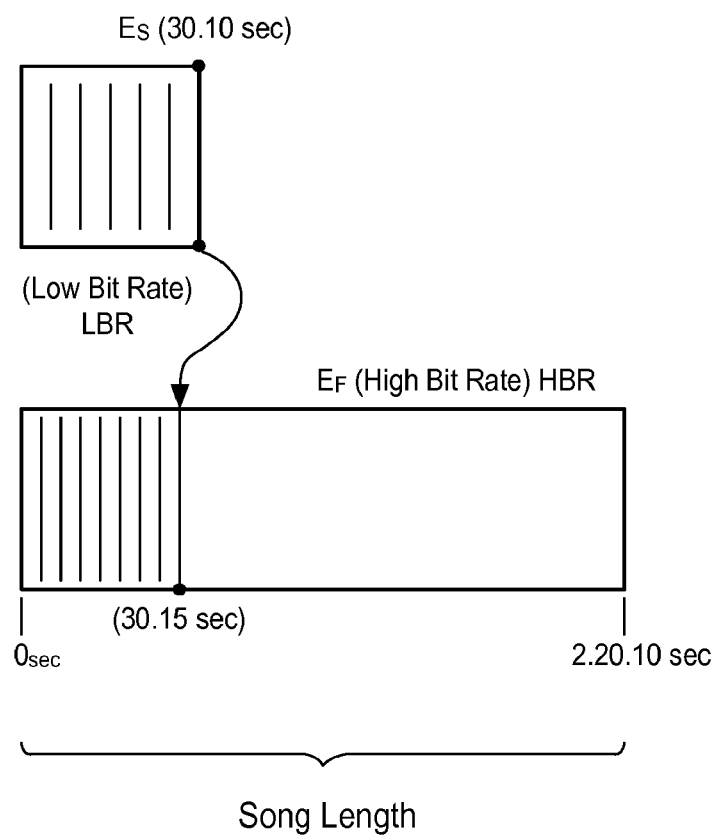

FIG. 4B illustrates an example of transition identification, in accordance with one embodiment of the present invention. Transition identification can be part of a calculation and examination of frames in the snippet of the audio file Es, and frames in the full audio file Ef. In one embodiment, the snippet audio file can be generated and produced in a low bit rate (LBR) format for size reduction, as mentioned above. Low bit rate formats will reduce the size of the snippets, and for large libraries, size reduction can be an important factor if memory or storage is limited on the device 106.

During playback, however, the audio file for the remaining portion can be provided at a higher bit rate, as it is streamed to the device for playback. Streaming data to the device can include caching of the data on the device temporarily for playback, without persistent storage of the entire audio file. As such, because the entire audio file is not saved in persistent storage, the remaining portion of the audio file that is streamed can be provided at a higher bit rate, which provides higher fidelity and clarity to the audio. As such, if the remaining portion of the audio file Er or the full audio file Ef is provided at a higher bit rate than the snippet, it is necessary that analysis of the frames is performed to identify a timing between the frames that is substantially identical, or within an acceptable range between the frames in the audio files of differing formats/bit rates.

In this example, the end frame in the snippet will and at time 30.10 seconds. Analysis of the frames in the higher bit rate (HBR) full audio file Ef will produce identification of a frame that is closest to that end time of the snippet as time 30.15 seconds. A difference in 0.05 seconds is negligible, and difficult if not impossible to notice by the human ear. As such, the transition will occur as a seamless transition in sound to a user between the snippet and the remainder of the full audio file. In one embodiment, it is possible to provide a difference that is up to about 500 ms (milliseconds) between the end of a snippet and beginning of a remaining portion of an audio file. In another embodiment, certain music files would require less separation, in the neighborhood of less than about 100 ms, and still further other music files would benefit from a separation that is less than about 30 ms.

In one embodiment, identifying the frames includes analysis of MP3 frames of both the HBR and LBR files (e.g., snippet and full files). Each MP3 frame can be, for example 23 milliseconds long, so transitions and gaps would be determined based on the frame sizes, and variations in frame sizes between higher and lower bit rates. Additional differences can be introduced by conversions between audio file formats, proprietary formats, etc. In any case, irrespective of the format, standard or file types, selections for transition gaps or overlaps, will be made in order to eliminate or make detection of a transition between a snippet and reminder of an audio file not noticeable or barely noticeable/detectable to a human ear.

It should be understood that this number of milliseconds separation can vary depending on the initial quality of the audio file, the content of the audio file, and the listening equipment (speakers, earphones, ear buds, etc.) connected to device 106.

Figure 5A:
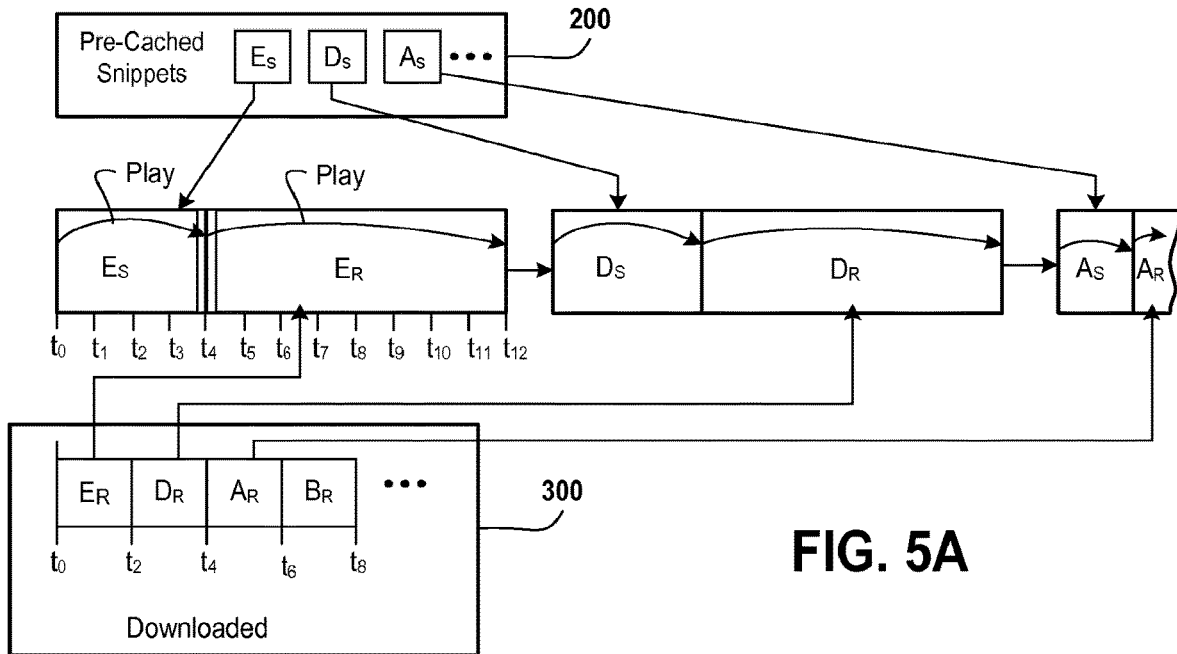
FIGS. 5A and 5B illustrate methods for accessing snippets for reducing latencies when beginning play from an audio file stored on a cloud storage system, in accordance with one embodiment of the present invention.

FIG. 5A illustrates an example where pre-cached snippets 200 are utilized to provide fast play of song selected by a user, during of a playlist A of songs selected by a user, in accordance with one embodiment of the present invention. In this example, song E will be played followed by song D, then followed by song A, and then followed by song B. As shown, snippet Es will first commence playing from the snippet file Es stored in the user's device 106. While the user is listening to snippet Es, between time t0 and t4, the remainder of song Er is being downloaded in operation 300. When the user reaches time t4, the transition between the snippet and the remainder of the song Er will take place, as mentioned with reference to FIG. 4B above.

Thus, the user will seamlessly continue listening to song E. During this time, the remainder of songs Dr, Ar and Br will be downloaded in operation 300. In this example, it is shown that it is possible to download, depending on download speed, the remainder of songs Er, Dr, Ar, and Br, while the user is listening to song E. In this example, all of the remainder portions of songs Er, Dr, Ar, and Br could be downloaded while the user is still listening to song E. If the user continues to listen to the playlist A, the user would then resume by listening to snippet Ds+the remainder of song Dr, followed by snippet As+the remainder of song Ar, etc.

Figure 5B:
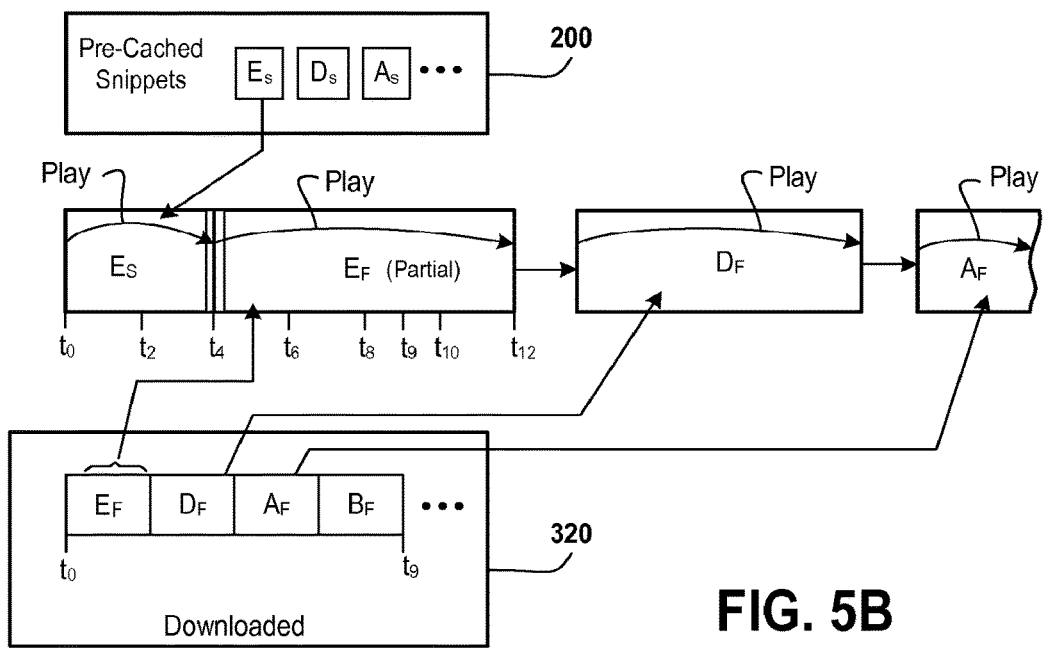

FIG. 5B illustrates another embodiment where play begins from snippet Es, and transitions into the appropriate transition time in a full audio file Ef In the graphic illustrated in FIG. 5B, the full audio file Ef is shown to be a partial audio file to convey that the beginning of play into the full audio file Ef happens at the appropriate transition time after the user finishes listening to the snippet Es. In operation 320, the downloading of the audio files takes place in the form of full audio files streamed to the device 106. The full audio files streamed to the device 106 will allow for a high fidelity entire song to be provided to device 106 from the loud music storage 116 via the music provider logic 114.

In this example, after the user completes listening to the entire song E, the user will commence listening to the streamed full audio file Df, and followed by the streamed full audio file Af, etc. In this example, the snippets are only utilized at the beginning of the first audio file being played, if there is sufficient time to stream a full or partial copy of the next audio file that would be playable to the user, without unnecessary delay. If delay is anticipated because the full next audio file is not ready for play during streaming from the cloud music storage 116, the application 140 will select the play from the pre-cached snippets 200 stored in the persistent storage of the device 106.

As such, application 140 will include logic for determining whether audio files are ready to be played, and if not ready, immediately play a snippet of the song to allow time to stream the remaining of the song and then transition into the remaining portion once made available. In this way, it is possible to transition between requiring use of the snippets to avoid delay, and avoiding use of the snippets if the audio files have been made available for play directly without the use of snippets. Additionally, application 140 can utilize snippets more frequently when a user decides to skip songs, or selects songs one after another during music surfing between songs. If the user surfs his or her audio files, the user will be surfing the various snippets. Once the user commits to listening to a specific song, the snippet can continue playing while the remainder of the song can be downloaded for streaming from the cloud music storage 116.

Figure 6A:
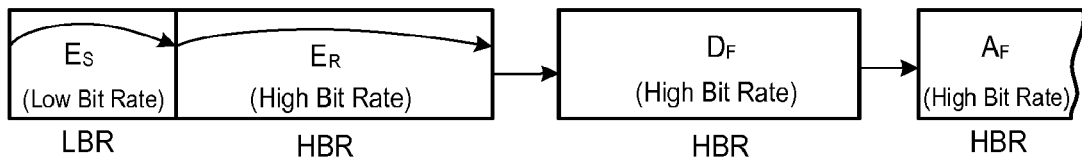
FIGS. 6A and 6B illustrate methods for using various types of bit rates for the snippets and remaining parts of an audio file, in accordance with one embodiment of the present invention.
Figure 6B:
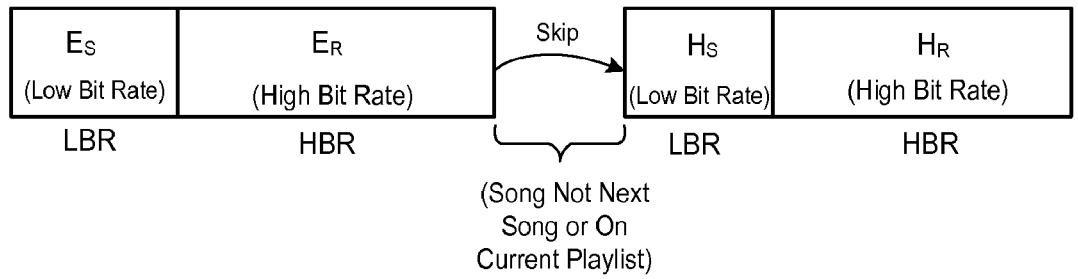

FIG. 6A illustrates an example where low bit rate snippets Es can be followed by high bit rate remainder portions of song Er. In addition, FIG. 6A shows a transition between a high bit rate file Er to a next song in the user's playlist D, which begins with a high bit rates downloaded portion Df, and then another high bit rate downloaded portion Af. FIG. 6B illustrates an example where a user begins with song E, the snippet of song Es in a low bit rate format is played, and transitioning into the remainder of song Er in a high bit rate format. If the user skips from song E to song H, and song H was not the next song in the playlist, the snippet Hs will be played at a low bit rate followed by the remainder of song Hr in a high bit rate.

In alternate embodiments, both the snippet and the remainder of the song will be high bit rate, both the snippet and the remainder the song will be low bit rate, or any combination of high and low bit rates. The selection of high and low bit rates for specific downloads will depend on the download speeds, the stored on the user's device, the performance selected, the fidelity selected for the audio files, and other variables.

Figure 7:
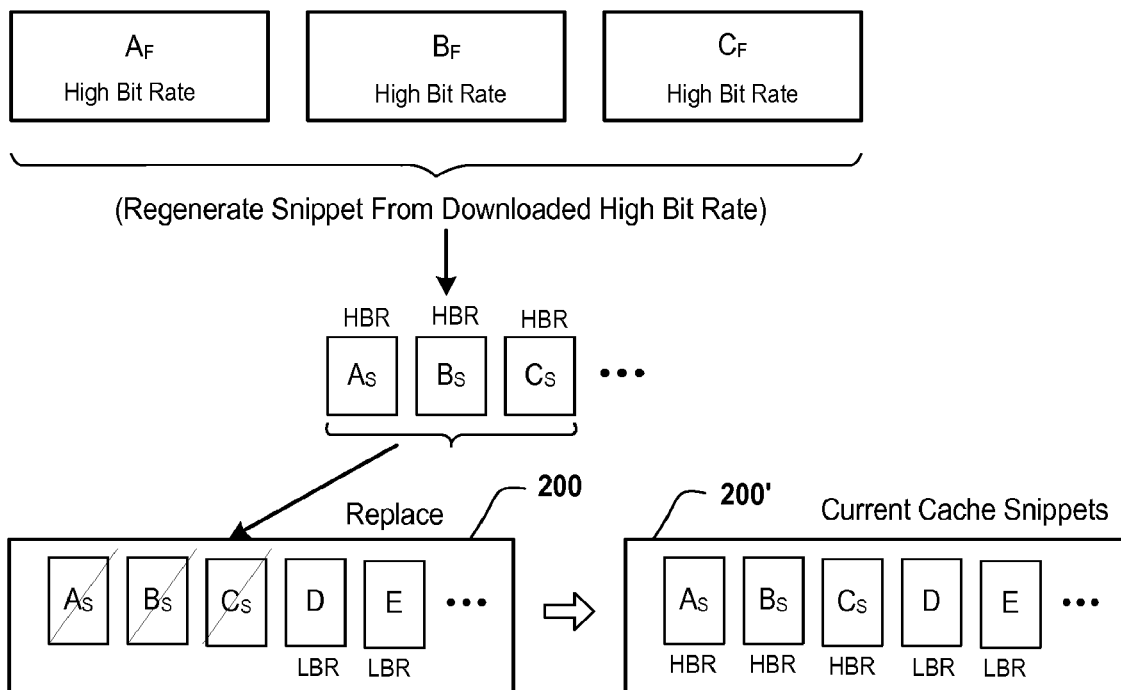
FIG. 7 illustrates an example of post processing full audio files on the client device to produce different bit rate snippets for storage on the device, in accordance with one embodiment of the present invention.

FIG. 7 illustrates an example where logic of the application 140 can process high bit rate files provided during streaming to the device 106 to create snippets of higher bit rates. For example, if the snippets 200 stored in the device 106 are all low bit rate snippets, and the device 106 obtains a full file in high bit rate during streaming, the application can process the high bit rate complete files into snippets of high bit rate formats. The high bit rate formats can then be replaced in the snippet data 200 to provide a new current cached snippets database where certain snippets are of high bit rate, while others remain low bit rate.

High bit rate snippets are useful for certain songs that require higher fidelity, while other songs do not require high bit rate fidelity due to the content. Accordingly, it should be understood that the application 140 is the application that communicates with the music provider logic 114, to provide a client/server system that operates in conjunction with each other to render music to devices, where audio files are stored in cloud music storage 116. Providing cloud music storage 116 enables a user to access his or her own entire library of songs from any location where Internet connection is available to the device.

The device, having the pre-stored snippets of the user's library, will provide for ease of listening to the library, whereby the user will have immediate access to the songs even while a majority or remainder of the song is still being downloaded for streaming to the user's device.

Figure 8:
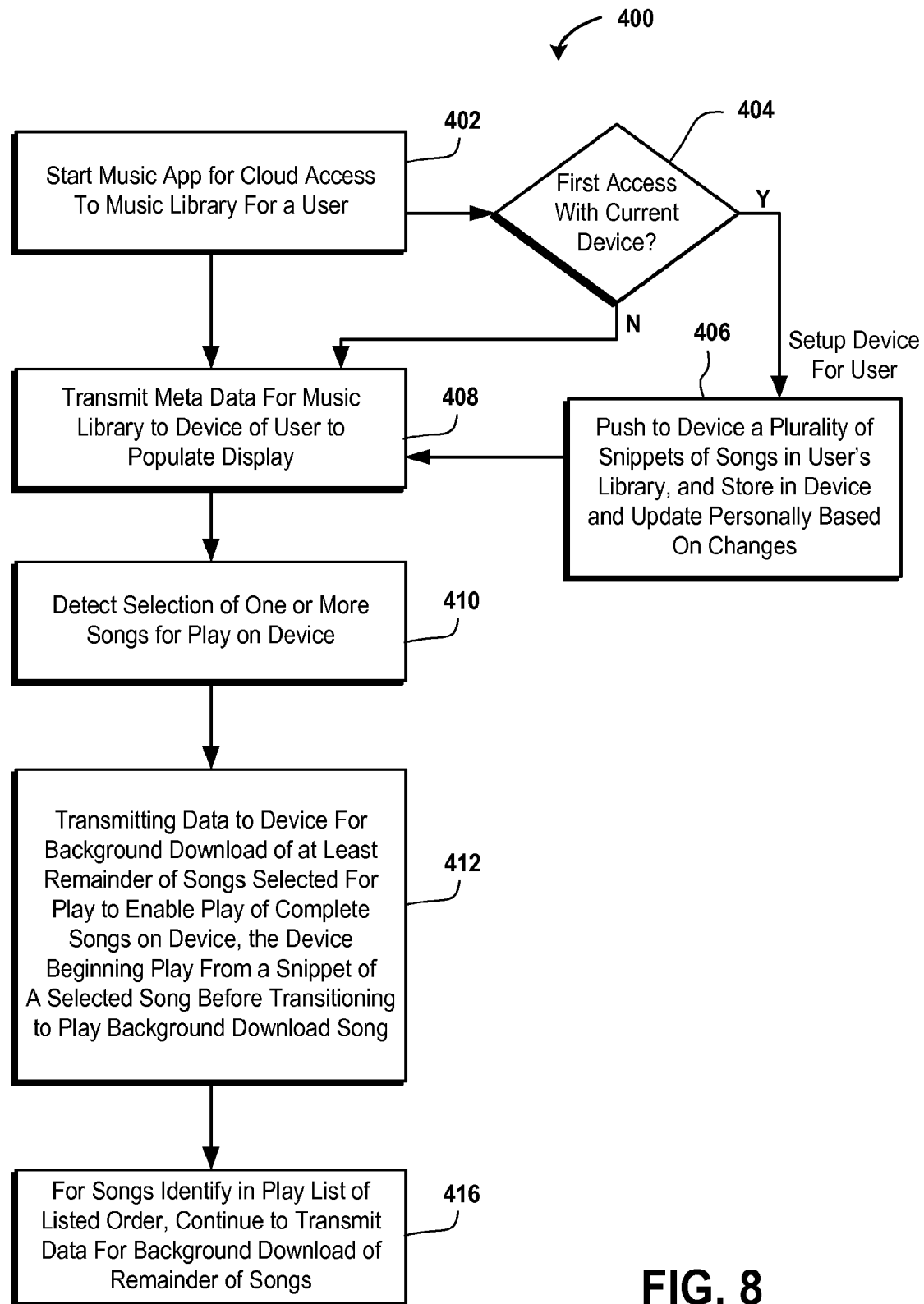
FIG. 8 illustrates a flow diagram of an example method for obtaining and using snippets of audio files on a device for reducing play latencies, in accordance with one embodiment of the present invention.

FIG. 8 illustrates an example flow diagram of operations performed by a server, in accordance with one embodiment of the present invention. The server operates code of one or more applications that enable the processes provided by the music provider logic 114, and access to the cloud music storage 116 that is made available by the digital service provider 102. The application 140 downloaded to the user's device is an application that is designed to communicate and cooperate processing with the music provider logic 114 on the server. Many of the operations performed by application 140, when executed on the device can operate without server assistance. In other operations, application 140 will cooperate in conjunction with code on the server to provide the data and streaming of the music to enable playback, listening, organization, and or modification of configuration data.

In one embodiment, a flow 400 is described in relation to operation performed by a server. Operation 402 includes the start of the music application for cloud access to the music library for a user. The application for cloud access can be, for example application 140 executing on the device, and a corresponding application executing on the server providing access to the music library for the user. In operation 404, it is determined if this is the first access with the current device, to the user's library. If it is the first access, the operation will move to operation 406.

Operation 406 will set up the device for the user. In this example, the server will push to the device a plurality of snippets of songs in the user's library, which are stored in the device and update periodically based on changes. If an operation 404 it is determined that is not the first access, the method moves to operation 408. Operation 408 can also be performed after setup and operation 406. In one embodiment, the setup can occur at various points in time, which allows for synchronization between audio files present on the cloud and snippets present on the device.

The synchronization procedure may include a polling process, whereby the server request info from the device to provide a list of snippets present on the device. Based on this information, the server can process and transmit additional snippets for new songs added to the user's library. If songs are removed from the library, snippets present on the device may be marked for deletion from the device at the direction of the server. As such, coordination of snippets present on the device can include various synchronization processes that operate over time and when conditions change, or based on timers, present condition triggers, user authentication, user membership level, user payments for the server, etc.

In operation 408, metadata is transmitted from the server for the music library, to the device of the user to populate the display. The display screen of the user will therefore provide information regarding all the songs contained in the user's library.

The display can provide various menus, filters, organizational tools, and functions to allow the user to manage the library. To the user, it appears that the entire library of songs is contained on the device, when in actuality, only the snippets described herein are stored on of the device, and the remainder of the songs are streamed to the device during listening of the snippets, or during other listening operations as described above.

In operation for 10, the server will detect selection of one or more songs for play on the device. The detection can occur when the server receives a request from the device to listen to certain songs or a playlist. Based on the detected selection, the server can transmit data to the device for background download of at least a remainder of songs selected for play to enable play of complete songs on the device. The device will begin playing from a snippet of a selected song before transitioning to play of the background downloaded song or downloaded remainder of the song.

In operation 416, four songs identified in a playlist or listed in some order, the method will continue to transmit data for background download of the remainder of the songs. In one embodiment, this will allow additional streaming of consecutive songs identified in a playlist, or listing of songs identified for play, to be pushed to the device in anticipation of play. In this manner, it is possible to begin by playing a snippet of one song, and then transitioning to the remainder of that one song, and then finally transitioning to full copies of other songs in the playlist without requiring use of the snippet. If the user skips around to various songs, the application will require use of snippets for those songs being played, and once the user fixes on a particular song, additional downloads in the background can occur of songs identified to be consecutive or in order after the currently playing song.

Figure 9:
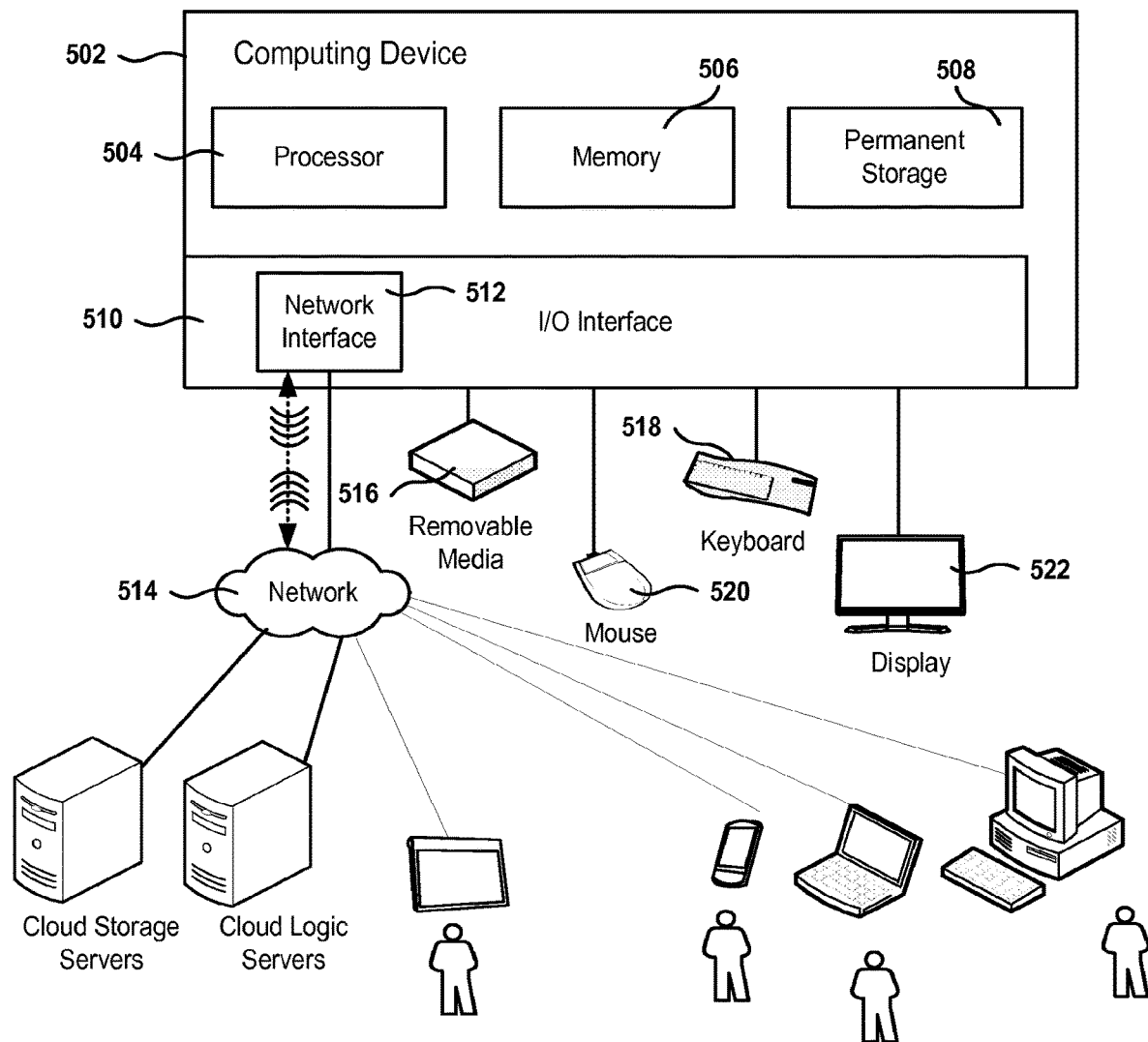
FIG. 9 is a simplified schematic diagram of a computer system for implementing embodiments of the present invention.

FIG. 9 is a simplified schematic diagram of a computer system 902 for implementing embodiments of the present invention. FIG. 9 depicts an exemplary computer environment for implementing embodiments of the invention. It should be appreciated that the methods described herein may be performed with a digital processing system, such as a conventional, general-purpose computer system. Special purpose computers, which are designed or programmed to perform only one function, may be used in the alternative. The computer system 502 includes a processor 504, which is coupled through a bus to memory 506, permanent storage 508, and Input/Output (I/O) interface 510.

Permanent storage 508 represents a persistent data storage device such as a hard drive or a USB drive, which may be local or remote. Network interface 512 provides connections via network 514, allowing communications (wired or wireless) with other devices. It should be appreciated that processor 504 may be embodied in a general-purpose processor, a special purpose processor, or a specially programmed logic device. Input/Output (I/O) interface 510 provides communication with different peripherals and is connected with processor 504, memory 506, and permanent storage 508, through the bus. Sample peripherals include display 522, keyboard 518, mouse 520, removable media device 516, etc.

Display 522 is configured to display the user interfaces described herein. Keyboard 518, mouse 520, removable media device 516, and other peripherals are coupled to I/O interface 510 in order to exchange information with processor 504. It should be appreciated that data to and from external devices may be communicated through I/O interface 510. Embodiments of the invention can also be practiced in distributed computing environments where tasks are performed by remote processing devices that are linked through a wired or a wireless network.

Embodiments of the present invention can be fabricated as computer readable code on a non-transitory computer readable storage medium. The non-transitory computer readable storage medium holds data which can be read by a computer system. Examples of the non-transitory computer readable storage medium include permanent storage 508, network attached storage (NAS), read-only memory or random-access memory in memory module 506, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 9 shows various types of devices that can connect to the network, such as the internet. The devices include servers, tablet computers, smartphones, laptops, desktops, etc. The various devices can run operating systems and the operating systems can vary from manufacturer to manufacturer.

Some, or all operations of the method presented herein are through a processor, such as processor 504 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method for audio file processing, the method comprising:

generating, using a hardware processor, an audio snippet from an audio file, wherein the audio snippet represents at least a beginning portion of the audio file;

transmitting, using the hardware processor, the audio snippet to a client device;

subsequent to transmitting the audio snippet to the client device, receiving, using the hardware processor, a request from an application executing on the client device that has detected that the audio file for which the audio snippet was generated and transmitted to the client device has begun being played back;

in response to receiving the request, causing, using the hardware processor, a background download of a full copy of the audio file while the audio snippet is being played back on the client device; and transmitting, using the hardware processor, the full copy of the audio file to the client device, wherein the audio snippet is transitioned to a location within the full copy of the audio file.

2. The method of claim 1, wherein the audio file is stored on a cloud storage server.

3. The method of claim 1, wherein the full copy of the audio file has an identified transition start point, and wherein the identified transition start point being a time in the audio file that corresponds to an end time of the audio snippet.

4. The method of claim 1, wherein the received request from the application executing on the client device includes an indication of a playlist of a plurality of audio files that includes the audio file and wherein the method further comprises:
   generating a plurality of audio snippets associated with the plurality of audio files; and
   transmitting the plurality of audio snippets to the client device.

5. The method of claim 4, further comprising, in response to completing the background download of the full copy of the audio file during the playback of the audio snippet, causing a subsequent background download of at least one of a plurality of remaining portions of the plurality of audio files corresponding to the plurality of audio snippets.

6. The method of claim 1, wherein the audio snippet has an associated size that is adjusted based on a network speed performance parameter of the client device.

7. A method for audio file processing, the method comprising:
   generating, using a hardware processor, an audio snippet from an audio file, wherein the audio snippet represents at least a beginning portion of the audio file and wherein a bit rate of the audio snippet is a function of a number of audio files in a library associated with a user account of a client device;
   transmitting, using the hardware processor, the audio snippet to the client device;
   subsequent to transmitting the audio snippet to the client device, receiving, using the hardware processor, a request from an application executing on the client device that has detected that the audio file for which the audio snippet was generated and transmitted to the client device has begun being played back;
   in response to receiving the request, causing, using the hardware processor, a background download of at least a remaining portion of the audio file while the audio snippet is being played back on the client device; and
   transmitting, using the hardware processor, the at least the remaining portion of the audio file to the client device.

8. A method for audio file processing, the method comprising:
   generating, using a hardware processor, an audio snippet from an audio file, wherein the audio snippet represents at least a beginning portion of the audio file;
   transmitting, using the hardware processor, the audio snippet to a client device;
   subsequent to transmitting the audio snippet to the client device, receiving, using the hardware processor, a request from an application executing on the client device that has detected that the audio file for which the audio snippet was generated and transmitted to the client device has begun being played back, wherein the request includes an indication of a playlist of a plurality of audio files in which the audio file is included;
   in response to receiving the request, causing, using the hardware processor, a background download of at least a remaining portion of the audio file while the audio snippet is being played back on the client device; and
   in response to completing the background download of the at least the remaining portion of the audio file during the playback of the audio snippet, causing a subsequent background download of full copies of one or more of the plurality of audio files.

9. A system for audio file processing, the system comprising:
   a memory; and
   a hardware processor that, when executing computer executable instructions stored in the memory, is configured to:
      generate an audio snippet from an audio file, wherein the audio snippet represents at least a beginning portion of the audio file;
      transmit the audio snippet to a client device;
      subsequent to transmitting the audio snippet to the client device, receive a request from an application executing on the client device that has detected that the audio file for which the audio snippet was generated and transmitted to the client device has begun being played back;
      in response to receiving the request, cause a background download of a full copy of the audio file while the audio snippet is being played back on the client device; and
      transmit the full copy of the audio file to the client device, wherein the audio snippet is transitioned to a location within the full copy of the audio file.

10. The system of claim 9, wherein the audio file is stored on a cloud storage server.

11. The system of claim 9, wherein the full copy of the audio file has an identified transition start point, and wherein the identified transition start point being a time in the audio file that corresponds to an end time of the audio snippet.

12. The system of claim 9, wherein the received request from the application executing on the client device includes an indication of a playlist of a plurality of audio files that includes the audio file and wherein the hardware processor is further configured to:
   generate a plurality of audio snippets associated with the plurality of audio files; and
   transmit the plurality of audio snippets to the client device.

13. The system of claim 12, wherein the hardware processor is further configured to, in response to completing the background download of the full copy of the audio file during the playback of the audio snippet, cause a subsequent background download of at least one of a plurality of remaining portions of the plurality of audio files corresponding to the plurality of audio snippets.

14. The system of claim 9, wherein the audio snippet has an associated size that is adjusted based on a network speed performance parameter of the client device.

15. A system for audio file processing, the system comprising:
   a memory; and
   a hardware processor that, when executing computer executable instructions stored in the memory, is configured to:
      generate an audio snippet from an audio file, wherein the audio snippet represents at least a beginning portion of the audio file, wherein a bit rate of the audio snippet is a function of a number of audio files in a library associated with a user account of a client device;

transmit the audio snippet to the client device;
subsequent to transmitting the audio snippet to the client device, receive a request from an application executing on the client device that has detected that the audio file for which the audio snippet was generated and transmitted to the client device has begun being played back;
in response to receiving the request, cause a background download of at least a remaining portion of the audio file while the audio snippet is being played back on the client device; and
transmit the at least the remaining portion of the audio file to the client device.

16. A system for audio file processing, the system comprising:
a memory; and
a hardware processor that, when executing computer executable instructions stored in the memory, is configured to:
generate an audio snippet from an audio file, wherein the audio snippet represents at least a beginning portion of the audio file;
transmit the audio snippet to a client device;
subsequent to transmitting the audio snippet to the client device, receive a request from an application executing on the client device that has detected that the audio file for which the audio snippet was generated and transmitted to the client device has begun being played back, wherein the request includes an indication of a playlist of a plurality of audio files in which the audio file is included;
in response to receiving the request, cause a background download of at least a remaining portion of the audio file while the audio snippet is being played back on the client device; and
in response to completing the background download of the at least the remaining portion of the audio file during the playback of the audio snippet, causing a subsequent background download of full copies of one or more of the plurality of audio files.

17. A non-transitory computer-readable medium containing computer executable instructions that, when executed by a processor, cause the processor to perform a method for audio file processing, the method comprising:
generating an audio snippet from an audio file, wherein the audio snippet represents at least a beginning portion of the audio file;
transmitting the audio snippet to a client device;
subsequent to transmitting the audio snippet to the client device, receiving a request from an application executing on the client device that has detected that the audio file for which the audio snippet was generated and transmitted to the client device has begun being played back;
in response to receiving the request, cause a background download of a full copy of the audio file while the audio snippet is being played back on the client device; and
transmit the full copy of the audio file to the client device, wherein the audio snippet is transitioned to a location within the full copy of the audio file.

18. A method for audio file processing, the method comprising:
generating, using a hardware processor, an audio snippet from an audio file, wherein the audio snippet represents at least a beginning portion of the audio file;
transmitting, using the hardware processor, the audio snippet to a client device;
subsequent to transmitting the audio snippet to the client device, receiving, using the hardware processor, a request from an application executing on the client device that has detected that the audio file for which the audio snippet was generated and transmitted to the client device has begun being played back;
in response to receiving the request, causing, using the hardware processor, a background download of at least a remaining portion of the audio file while the audio snippet is being played back on the client device; and
transmitting, using the hardware processor, the at least the remaining portion of the audio file to the client device, wherein a transition point between an ending frame of the audio snippet and a starting frame of the at least the remaining portion of the audio file is identified.

19. A system for audio file processing, the system comprising:
a memory; and
a hardware processor that, when executing computer executable instructions stored in the memory, is configured to:
generate an audio snippet from an audio file, wherein the audio snippet represents at least a beginning portion of the audio file;
transmit the audio snippet to a client device;
subsequent to transmitting the audio snippet to the client device, receive a request from an application executing on the client device that has detected that the audio file for which the audio snippet was generated and transmitted to the client device has begun being played back;
in response to receiving the request, cause a background download of at least a remaining portion of the audio file while the audio snippet is being played back on the client device; and
transmit the at least the remaining portion of the audio file to the client device, wherein a transition point between an ending frame of the audio snippet and a starting frame of the at least the remaining portion of the audio file is identified.

* * * * *